United States Patent [19]
Howard

[11] 4,254,230
[45] Mar. 3, 1981

[54] ACTINIC RADIATION-CURABLE FORMULATIONS OF UNSATURATED POLYETHERESTER URETHANE

[75] Inventor: Dennis D. Howard, Girard, Pa.

[73] Assignee: Lord Corporation, Erie, Pa.

[21] Appl. No.: 102,299

[22] Filed: Dec. 10, 1979

Related U.S. Application Data

[60] Division of Ser. No. 2,114, Jan. 9, 1979, Pat. No. 4,188,455, which is a continuation-in-part of Ser. No. 866,575, Jan. 3, 1978, Pat. No. 4,133,723.

[51] Int. Cl.$^3$ .................... C08F 283/04; C08G 18/04; C08G 18/34; C08J 3/28
[52] U.S. Cl. .................................... 525/28; 525/440; 525/920; 528/75
[58] Field of Search ...................... 525/440, 28, 920; 528/75

[56] References Cited

U.S. PATENT DOCUMENTS

| 3,425,988 | 2/1969 | Gorman et al. | 260/32.8 N |
|---|---|---|---|
| 3,509,234 | 4/1970 | Burlant et al. | 204/159.15 |
| 3,700,643 | 10/1972 | Smith et al. | 204/159.14 |
| 3,715,293 | 2/1973 | Sandner et al. | 204/159.23 |
| 3,759,807 | 9/1973 | Osborn et al. | 204/159.23 |
| 4,017,371 | 4/1977 | Morgan | 204/159.18 |
| 4,017,652 | 4/1977 | Gruber | 427/54.1 |
| 4,024,296 | 5/1977 | Gruber | 204/159.23 |

*Primary Examiner*—John C. Bleutge
*Assistant Examiner*—Arthur H. Koeckert
*Attorney, Agent, or Firm*—John A. Gazewood

[57] ABSTRACT

Energy curable compositions which can be cured in the presence of air by exposure to actinic radiation contain at least one unsaturated urethane oligomer, said oligomer comprising the reaction product of at least one unsaturated active hydrogen-containing compound; at least one polyisocyanate; and at least one polyetherester, said polyetherester having in its main chain the residue of at least one poly(alkylene oxide) polyol.

6 Claims, No Drawings

ACTINIC RADIATION-CURABLE FORMULATIONS OF UNSATURATED POLYETHERESTER URETHANE

This is a division of application Ser. No. 002,114; filed Jan. 9, 1979, now U.S. 4,188,455, as a continuation-in-part of application Ser. No. 866,575, filed Jan. 3, 1978, and now U.S.A. Pat. No. 4,133,723.

This invention relates to radiation-curable compositions. More particularly, the invention relates to actinic radiation-curable compositions characterized by a reduced sensitivity to oxygen inhibition during the curing process.

During the latter part of the past decade, significant advances have been made in the radiation processing of commercial products. The increased interest in energy-curable systems has been catalyzed by recently-enacted or impending legislation by federal, state and local governments which restrict the amount of solvent and other pollutants that can be vented to the atmosphere, and the increased concern expressed by individuals and unions over the possible toxic effects of prolonged exposure to volatile organic materials, as well as the sky-rocketing cost of solvents derived from petroleum coupled with a grim prospect of material unavilability. Generally, the energy-curable systems are 100% reactive systems, i.e., substantially all of the components react to produce the final product. As is well-known, the curing of such systems can be effected by several means, including exposure to high energy ionizing radiation; photopolymerization by actinic radiation in the presence of a photoinitiator; and by exposure to chemical free radical-generating agents, usually at an elevated temperature. A particular deficiency of all radiation curable compositions which cure via a free radical addition mechanism is a sensitivity to oxygen inhibition during the curing process. Oxygen inhibition is not a serious problem when cure is effected by exposure to high energy ionizing radiation or by exposure to thermally-activated free radical-generating agents. Oxygen inhibition does materially affect compositions which are cured by exposure to actinic radiation, such as ultraviolet light.

A typical actinic radiation-curable resin system contains an oligomer, which may or may not contain reactive functional groups (such as double bonds), a crosslinking agent, a reactive diluent for viscosity control, and a photosensitizer or photoinitiator. By selecting an oligomer which contains at least two points of reactive unsaturation, or a reactive diluent which likewise contains at least two points of reactive unsaturation, one may eliminate the need for a crosslinking agent per se. Control over the properties of the cured systems can be exercised via the structure of the oligomer backbone, including such factors as degree of chain-branching, types of functional groups, number and types of unsaturated bonds, molecular weight, etc.; functionality and level of crosslinking agents; nature and level of reactive diluent; kind and level of the sensitizer or photoinitiator; and the like. An exemplary oligomer which has obtained widespread commercial acceptance and which can be cured by exposure to actinic radiation in the absence of a crosslinking agent per se is an unsaturated urethane oligomer obtained by reacting an isocyanate-functional prepolymer with unsaturated compounds containing an isocyanate-reactive active hydrogen group. Before any polymerization can occur, free radicals must first be produced via the photoinitiator. The production of free radicals by the photoinitiator is a wave length function of the actinic radiation. Once the radicals are formed, propagation of polymer growth rapidly advances through chain reaction. Oxygen in the ground or unexcited state is itself a radical and is highly reactive with other radicals. Thus, chain growth can be terminated by the oxygen radical, resulting in uncured or tacky surfaces and, more importantly, the photoinitiator itself when in the free radical state can be capped and rendered ineffective. In addition, the presence of oxygen has a retarding effect on the cure rate.

The adverse effect of oxygen inhibition can be at least reduced by curing in an inert gaseous environment (nitrogen, argon, carbon dioxide, and the like). While effective, the use of inert gas environments is generally cumbersome and economically unattractive. Other methods which have been suggested for reducing the air inhibition effect on actinic energy-curable compositions include improved design of energy sources, increasing photoinitiator level, use of more reactive diluent systems, and use of natural and synthetic waxes. Except for the improved energy sources which must be proved out, the suggested methods directly affect ultimate properties of the cured systems and are not susceptible to widespread utilization. There remains a compelling need for means to reduce the sensitivity of actinic radiation-curable compositions to oxygen inhibition during the curing process. There is also a need to increase the rate of curing in both inert and oxygen-containing environments, and especially the latter.

An approach taken with some success in the prior art, both with respect to air-cure capability and cure rate, has been through modification of the photocatalyst system. For example, Gruber U.S.A. Pat. No. 4,017,652 discloses that oxygen inhibition of the photopolymerization of resins containing acrylic groups can be abated by employing a photocatalyst system containing (1) as a photosensitizer, at least one aromatic ketone or aromatic aldehyde which has a triplet energy in the range of from about 54 kilocalories per mole to about 72 kilocalories per mole and which promotes polymerization through bimolecular photochemical reactions of the energy donor type; and, (2), as a photoinitiator, at least one aromatic ketone which generates a radical pair by way of unimolecular homolysis resulting from photoexcitation. A preferred photocatalyst system is benzophenone and isobutyl benzoin ether. The proposed photocatalyst systems are effective in reducing oxygen inhibition; however, they suffer from the deficiency that the time required for cure in oxygen is longer than the time required to cure the same formulation in an inert environment. The increased cure cycle is highly disadvantageous, because of its deleterious effect on many substrates, such as warping and charring; and because it negatively affects productivity.

Osborn et al, U.S.A. Pat. No. 3,759,807 disclose that the photopolymerization rate, that is, the cure rate, can be accelerated by employing combinations of certain organic carbonyl compounds, such as benzophenone, in combination with certain organic amine compounds, such as triethanolamine. However, these photocatalyst systems are essentially ineffective in providing both bulk and surface cure in oxygen-containing environments and, as with the Gruber systems, the systems are significantly slower in oxygen-containing environments than in inert atmospheres.

Continued research into the development of energy curable compositions which can be cured by exposure to actinic radiation in the presence of air has resulted in the discovery that unsaturated urethane oligomers derived from certain hereinafter described polyetherester polyols can be cured, in combination with photocatalyst systems comprising, (I) at least one compound which promotes free radical addition polymerization through bimolecular photochemical reactions of the energy donor or transfer type, of the hydrogen abstraction type, or by formation of a donor-acceptor complex with monomers or additives leading to ionic or radical species; or, (II), at least one compound (I) in combination with at least one compound which promotes free radical addition polymerization by generating reactive specie, such as free radicals, by way of unimolecular homolysis resulting from photoexcitation, by exposure to actinic radiation in the presence of air in an unexpectedly short cure cycle. It was also discovered that (1) ultimate properties of the cured compositions can be enhanced by incorporating into the curable formulations at least one chain transfer agent and, (2), certain chain transfer agents are effective in further increasing rate of cure.

The present invention is based on the discovery that the nature of the polyol which is employed in forming energy-curable unsaturated urethane oligomers does materially affect the curing rate in air of such oligomers. More particularly, it has been discovered that the use of polyetherester polyols which contain the residues of certain hereafter described polyether polyols integrated into the backbone of such polyetherester polyols as precursor compounds for actinic radiation-curable unsaturated urethane oligomers affords compositions which can be cured in air at rates approaching those encountered when curing is effected in inert atmospheres. The discovery was particularly unexpected because there is no significant difference in the cure rate of unsaturated urethane oligomers, regardless of the precursor materials employed in preparing such oligomers, when cure is effected in an inert atmosphere.

Thus, in accordance with one aspect of the invention, there are provided novel unsaturated urethane oligomers comprising the reaction product of, (i), at least one organic isocyanate compound having at least two isocyanate groups; (ii), at least one polyetherester polyol containing the residue of at least one poly(alkylene oxide) polyol integrated into the backbone of such polyetherester polyol; and, (iii) at least one unsaturated addition-polymerizable monomeric compound having a single isocyanate-reactive active hydrogen group.

In a second aspect of the invention, there are provided novel energy curable compositions comprising (a), unsaturated urethane oligomers comprising the reaction product of (i), at least one organic isocyanate compound having at least two isocyanate groups; (ii), at least one polyetherester polyol containing the residue of at least one poly(alkylene oxide) polyol integrated into the backbone of such polyetherester polyol; and, (iii) at least one unsaturated addition-polymerizable monomeric compound having a single isocyanate-reactive active hydrogen group; (b) at least one reactive monomer diluent; and, optionally, (c) a photocatalyst system selected from the group consisting of (I), at least one compound which promotes free radical addition polymerization through bimolecular photochemical reactions of the energy donor or transfer type, of the hydrogen abstraction type, or by the formation of a donor-acceptor complex with monomers or additives leading to ionic or radical species; and (II) an admixture comprising, (i), at least one photocatalyst system (I) compound in association with, (ii) at least one compound which promotes free radical addition polymerization by generating reactive specie by way of unimolecular homolysis resulting from photoexcitation; and, (d), also optionally, an effective amount of at least one chain-transfer agent, and, (e), also optionally, up to 75 percent by weight of at least one unsaturated urethane oligomer derived from a non-poly(alkylene oxide) polyol precursor, said weight percent being based on total weight of (a) and (e).

Additionally, the invention provides a process for coating a substrate which comprises applying to a surface of the substrate the energy-curable compositions of this invention and exposing such coated substrate to actinic radiation in the presence of air whereby the coating is cured into a hard mar and abrasion resistant film. The invention also contemplates articles of manufacture comprising a substrate having a desired geometrical configuration and size having thereon a cured wear coating, said coating being formulated, applied and cured according to the concepts of the herein-described invention.

The novel unsaturated urethane oligomers of the present invention are characterized by the presence of at least one ethylenically unsaturated group having the structure $-CH=C<$, preferably having the structure $CH_2=C<$, said group preferably being terminally located; and having a main carbon-carbon chain or backbone containing the residue of at least one poly(alkylene oxide) polyol, said main chain or backbone being separated from said ethylenically unsaturated group by at least two urethane groups. Such unsaturated urethane oligomers comprise the reaction product of (i) at least one organic isocyanate compound having at least two isocyanate groups;

(ii) at least one polyetherester polyol having at least two hydroxyl groups, said polyetherester polyol comprising the reaction product of (a) from 3 to 100, preferably 40 to 100, mol percent of at least one poly(alkylene oxide) polyol having at least two hydroxyl groups;

(b) from 97 to zero mol percent of at least one polymeric non-poly(alkylene oxide) polyol having at least two hydroxyl groups;

(c) from 97 to zero mol percent of at least one monomeric polyol having at least two hydroxyl groups; and (d) from 97 to zero mol percent of at least one polyester which does not contain poly(alkylene oxide) polyol residues in its backbone;
said mol percents being based on total mols of precursor materials (ii)(a)-(ii)(d); and (e) at least one organic polycarboxylic acid characterized by the presence of at least two carboxyl groups; and (iii) at least one unsaturated addition-polymerizable monomeric compound having a single isocyanate-reactive active hydrogen group;

there being present an excess of isocyanate compound with respect to the hydroxyl groups of said polyetherester polyol;

said unsaturated addition-polymerizable monomeric compound having a single isocyanate-reactive active hydrogen group being present in an amount sufficient to provide at least one molar equivalent of active hydrogen group with respect to isocyanate reactivity. The invention contemplates unsaturated urethane oligomers having at least one reactive isocyanate moiety, as well as such oligomers having substantially no reactive isocyanate functionality, with the latter oligomers being especially preferred. An especially preferred class of unsaturated urethane oligomers are the acrylated urethane oligomers, urethane oligomers which have been modified by incorporating into the oligomeric molecule one or more acrylic groups having the structure

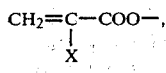

wherein X is hydrogen, halogen or an alkyl group of 1 to 8 carbon atoms.

The isocyanate compounds which are employed in forming the unsaturated urethane oligomers in accordance with the present invention can be any organic isocyanate compound having at least two free isocyanate groups. Included within the purview of suitable polyisocyanates are aliphatic, cycloaliphatic, and aromatic polyisocyanates, as these terms are generally interpreted in the art. Thus it will be appreciated that any of the known polyisocyanates such as alkyl and alkylene polyisocyanates, cycloalkyl and cycloalkylene polyisocyanates, aryl and arylene polyisocyanates, and combinations such as alkylene, cycloalkylene and alkylene arylene polyisocyanates, can be employed in the practice of the present invention.

Suitable polyisocyanates include, without limitation, tolylene-2,4-diisocyanate, 2,2,4-trimethylhexamethylene-1,6-diisocyanate, hexamethylene-1,6-diisocyanate, diphenylmethane-4,4'-diisocyanate, triphenylmethane-4,4',4''-triisocyanate, polymethylene polyphenylisocyanate, m-phenylene diisocyanate, p-phenylene diisocyanate, 2,6-tolylene diisocyanate, 1,5-naphthalene diisocyanate, naphthalene-1,4-diisocyanate, diphenylene-4,4'-diisocyanate, 3,3'-bi-tolylene-4,4'-diisocyanate, 1,4-cyclohexylene dimethylene diisocyanate, xylylene-1,4-diisocyanate, xylylene-1,3-diisocyanate, cyclohexyl-1,4-diisocyanate, 4,4'-methylene-bis(cyclohexyl isocyanate), 3,3'-dimethyldiphenylmethane-4,4'-diisocyanate, isophorone diisocyanate, the product obtained by reacting trimethylol propane and 2,4-tolylene diisocyanate in a ratio of 1:3, and the like. The diisocyanate compounds are preferred, with 4,4'-methylene-bis(cyclohexyl isocyanate) being especially preferred.

It is essential that the polyetherester polyols which are utilized to form the novel unsaturated urethane oligomers of the present invention have as an integral part of the backbone or main polymer chain the residue of at least one poly(alkylene oxide) polyol, that is, the polyetherester polyol must have a polyether recurring unit of the structure —(RO)—$_n$ in the main chain, said recurring unit being the residue of at least one poly(alkylene oxide) polyol, n is at least 2, and R is a hydrocarbon chain which can be interrupted by one or more ether oxygen atoms. As noted, the polyetherester can be derived entirely from poly(alkylene oxide) polyols having at least two hydroxyl groups or can contain up to 97 mol percent, based on the total hydroxyl content, of at least one non-poly(alkylene oxide) polyol monomeric or polymeric compound having at least two hydroxy groups.

The poly(alkylene oxide) polyols having at least two hydroxyl groups which are essential to the present invention are normally obtained from the polymerization, including block copolymerization, of cyclic ethers such as alkylene oxides, dioxolane and tetrahydrofuran, the condensation of glycols, or the condensation of cyclic ethers with glycols. They are well-known articles of commerce, and are also called polyalkylene ether glycols, polyalkylene glycols, polyalkylene oxide glycols, polyglycols and polyoxyalkylene glycols. They may be represented by the formula HO(RO)$_n$H, in which R is an alkylene radical and n is at least 2. The alkylene radical can be a single chain or can consist of two or more alkylene chains separated from each other by an ether oxygen atom. Preferred poly(alkylene oxide) polyols have from 1 to 9, preferably 1 to 6 carbon atoms in the alkylene chain separating each pair of oxygen atoms and have a number average molecular weight in the range from about 106 to about 4000, preferably about 106 to about 2500. Not all the alkylene units need be the same. Poly(alkylene oxide) polyols formed by the copolymerization or condensation of mixtures of different cyclic ethers, glycols, or glycols and cyclic ethers can be used; as can poly(alkylene oxide) polyols derived from cyclic ethers such as dioxolane, which affords a polyol having the formula HO(CH$_2$—O—CH$_2$CH$_2$O)$_n$H, where n is greater than 1. The alkylene unit can be a straight or a branched chain, as in poly(propylene oxide) polyol. In the case where the alkylene unit is ethylene, it can be advantageous to incorporate the unit into a copolymer, for example, as a copolymer of ethylene oxide and propylene oxide, with up to 80 percent of such copolymer comprising ethylene oxide. Representative poly(alkylene oxide) polyols include poly(ethylene oxide) polyols, poly(propylene oxide) polyols, poly(tetramethylene oxide) polyols, poly(nonamethylene oxide) polyols, poly(oxymethylene-ethylene oxide) polyols, poly(ethylene oxide-propylene oxide copolymer) polyols, and poly(pentaerythritol-ethylene oxide) polyols. Thus the poly(alkylene oxide) polyols will generally have from 2 to 6 hydroxyl groups, with such polyols having 2 hydroxyl groups being currently preferred. Preferred poly(alkylene oxide) polyols are poly(tetramethylene oxide) polyols, poly(propylene oxide) polyols, poly(ethylene oxide-propylene oxide) polyols, and poly(ethylene oxide) polyols, with the latter being especially preferred.

Another useful group of poly(alkylene oxide) polyols which can be employed in the practice of the invention are poly(alkylene etherthioether) compounds, which compounds have the identical formula as the poly(alkylene oxide) polyols except that some of the ether oxygens have been replaced with sulfur atoms. Such polyols are conveniently prepared by the reaction of a compound such as thiodiglycol with ethylene glycol in the presence of a catalytic amount of p-toluene sulfonic acid. Other polyethers, such as poly(alkylene oxide-arylene ether) polyols may be used.

Substantially any of the known monomeric alcohols having at least two hydroxyl groups, and polymeric non-poly(alkylene oxide) polyols having at least two hydroxyl and polyesters which do not contain poly(alkylene oxide) polyol residues in the backbone or main chain can be employed in combination with poly(alkylene oxide) polyols to form the polyetherester polyols which serve as precursor materials for the unsaturated urethane oligomers of the invention. Representative monomeric and polymeric polyols and polyesters which can optionally provide up to about 97 mol percent of hydroxyl functionality include 1,4-butanediol; 1,3-butylene glycol; 1,6-hexane diol; cyclohexane diol; 4,4'-methylenebis-(cyclohexanol); glycerol; trimethylolpropane; 1,2,6-hexanetriol; erythritol; pentaerythritol; neopentyl glycol; polycaprolactone diols and triols, poly(butadiene) diols; hydroxylated poly(butadiene) dienes; poly(tetramethylene adipate) diol; poly(ethylene succinate) diol; poly(1,3-butylene sebacate) diol; and (1,3-butylene glycol/glycerine/adipic acid/isophthalic acid) diols and triols. Mixtures of such monomeric and polymeric compounds can be employed.

Polycarboxylic acids which may be employed in forming the polyetherester polyols which must be utilized in the present invention consist primarily of monomeric carboxylic acids having at least two carboxyl groups or their anhydrides having from 2 to 14 carbon atoms per molecule, with dicarboxylic acids or their anhydrides being currently preferred. Among such useful acids are phthalic acid, isophthalic acid, terephthalic acid, tetrahydrophthalic acid, hexahydrophthalic acid, adipic acid, sebacic acid, maleic acid, glutaric acid, chlorendic acid, tetrachlorophthalic acid, itaconic acid, trimellitic acid, tricarballylic acid, and other known polycarboxylic acids of varying type. It is currently preferred that the polyetherester include an aliphatic dicarboxylic acid as at least part of the acid component.

The polyetherester precursor materials for the unsaturated urethane oligomers of the invention are prepared by conventional esterification techniques employing conventional apparatus. Esterification is generally carried out in the presence of an inert atmosphere such as nitrogen. The polyol components are mixed in a suitable reactor and heated with agitation of from about 60° C. to about 100° C. The acid components are then added and agitation and heating continued at a rate such that the water of esterification can be rapidly removed, generally by distillation. The esterification reaction is continued until the acid number is ten or less and substantially all of the water of esterification and low boiling impurities are removed. The reaction proceeds smoothly with heating. If desired, esterification catalysts such as tertiary amines and organometallic compounds can be employed.

Unsaturated addition-polymerizable monomeric organic compounds having a single isocyanate-reactive hydrogen group which can be employed in the practice of the present invention include any of such compounds which have been previously used to introduce an unsaturated polymerizable moiety into a molecule via reaction between the active hydrogen group and a reactive isocyanate moiety. Preferably, the active hydrogen group is hydroxy. Illustrative of unsaturated addition-polymerizable monomeric organic compounds having a single isocyanate-reactive active hydrogen group are 2-hydroxyethyl acrylate, 2-hydroxyethyl methacrylate, 2-hydroxypropyl acrylate, 2-hydroxypropyl methacrylate, N-hydroxymethyl acrylamide, N-hydroxymethyl methacrylamide, diethylene glycol monoacrylate, diethylene glycol monomethacrylate, glycerine dimethacrylate, trimethylol propane dimethacrylate, and the like. The amount of such compounds will be sufficient to provide at least one molar equivalent of active hydrogen group with respect to isocyanate functionality, and preferably is sufficient to afford an active hydrogen group: NCO ratio, with respect to the amount of total free hydroxyl functions, of at least 1:1, with a small excess, 10 mol percent or less, being especially preferred.

The novel unsaturated urethane oligomers can be prepared by any of several known reaction routes, including (1) simultaneous reaction of polyisocyanate, polyetherester polyol and unsaturated addition-polymerizable monomeric compound having a single isocyanate-reactive active hydrogen group; and (2) reaction of polyisocyanate and unsaturated addition-polymerizable monomeric compound having a single isocyanate-reactive active hydrogen group to form an unsaturated isocyanate-functional compound which is then reacted with the polyetherester polyol, the amount of unsaturated isocyanate being sufficient to consume all hydroxyl groups of the polyol with excess isocyanate functions being preferably reacted with additional unsaturated polymerizable monomeric compound. The preferred method of forming the herein described oligomers is, (3) a two-step process comprising, (I), contacting polyetherester polyol with sufficient polyisocyanate to form an isocyanate-functional urethane prepolymer, and, (II), contacting such urethane prepolymer with unsaturated addition-polymerizable monomeric organic compound having a single isocyanate-reactive active hydrogen group to produce the desired oligomer having at least one unit of ethylenic unsaturation per molecule, with acrylated urethane oligomers, especially acrylated urethane oligomers having substantially no free isocyanate functionality, being especially preferred. In forming the herein described oligomers, there will be employed at least a slight excess of polyisocyanate with respect to the hydroxyl functions of the polyol. Preferably, the amount of polyisocyanate will be sufficient to provide an NCO:OH ratio, with respect to the hydroxyl groups of the poly(alkylene oxide ether) polyol, of at least 2.1:1, preferably at least 2.3:1, and especially at least 2.5:1, with an NCO:OH ratio in the range of about 2.5–5:1 being particularly preferred. The oligomers of this invention can be prepared neat, as can the intermediates in the multi-step processes, but are preferably prepared in the presence of a diluent phase which is copolymerizable with the unsaturated urethane oligomer but is otherwise inert during the particular process of preparing the oligomers. Because the various methods of preparing unsaturated urethane resins are well-known, for example, see U.S. Pat. No. 3,700,643, it is considered that any detailed discussion of such methods is unnecessary.

As noted, the energy-curable compositions of the present invention comprise a mixture of
 (i) at least one unsaturated urethane resin prepared in accordance with this invention; and
 (ii) a reactive diluent system comprising at least one unsaturated addition-polymerizable monomeric compound which is copolymerizable with said unsaturated urethane resin, and preferably containing at least one acrylic and/or methacrylic acid ester containing at least 4 carbon atoms in the non-acid moiety.

When curing is effected in air by exposure to actinic radiation, the energy-curable compositions of the present invention will have incorporated therein an effective amount of a photocatalyst system selected from the group consisting of, (I), at least one compound which promotes free radical addition polymerization through bimolecular photochemical reactions of the energy donor or transfer type, of the hydrogen abstraction type, or by the formation of a donor-acceptor complex with monomers or additives leading to ionic or radical species or, (II) at least one compound which promotes free radical addition polymerization through bimolecular photochemical reactions of the energy donor or transfer type, of the hydrogen abstraction type, or by the formation of a donor-acceptor complex with monomers or additives leading to ionic or radical species in combination with at least one compound which promotes free radical addition polymerization by generating a radical pair by way of unimolecular homolysis resulting from photoexcitation.

The energy-curable compositions can optionally contain an effective amount of at least one chain transfer agent and, also optionally, up to about 75 percent by weight, based on resin solids, of at least one unsaturated urethane oligomer, preferably an acrylated urethane oligomer, said oligomer having as a polyol precursor at least one non-poly(alkylene oxide) polyol.

Reactive diluent systems which can be employed in the energy curable compositions of this invention include any of such systems which have been or are being used for this purpose. Broadly, suitable reactive diluent systems comprise at least one unsaturated addition-polymerizable monomeric compound which is copolymerizable with the unsaturated urethane oligomer upon exposure to actinic radiation. The reactive diluent can be monofunctional or polyfunctional, with respect to polymerizable moieties. A single polyfunctional reactive diluent can be used, as can mixtures thereof; or a combination of one or more monofunctional reactive diluents and one or more polyfunctional reactive diluents can be used. Such combinations of mono- and polyfunctional reactive diluents are presently preferred. Generally, the reactive diluent system will comprise from about 10 to about 65, preferably about 15 to about 50, weight percent, based on total weight of unsaturated urethane oligomer and reactive diluent, of the energy curable compositions of the invention. Particularly preferred reactive diluents are unsaturated addition-polymerizable monofunctional monomeric compounds selected from the group consisting of esters having the general formula

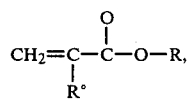

wherein R° is hydrogen or methyl, and R is an aliphatic or cycloaliphatic group having from 4 to 18 carbon atoms. Representative of such preferred reactive monomeric diluents, without limitation thereto, are hexyl acrylate, cyclohexyl acrylate, 2-ethylhexyl acrylate, octyl acrylate, nonyl acrylate, stearyl acrylate, and the corresponding methacrylates. Illustrative of other reactive monofunctional and polyfunctional monomeric diluents which can be employed are styrene, methyl methacrylate, butyl acrylate, isobutyl acrylate, 2-phenoxy acrylate, 2-methoxyethyl acrylate, 2-(N,N-diethylamino)-ethyl acrylate, the corresponding methacrylates, acrylonitrile, methyl acrylonitrile, methacrylamide, neopentyl glycol diacrylate, ethylene glycol diacrylate, hexylene glycol diacrylate, diethylene glycol diacrylate, trimethylol propane triacrylate, pentaerythritol di-, tri-, or tetra-acrylate, the corresponding methacrylates, vinyl pyrrolidone, and the like. At the present time, it is preferred that the reactive diluent system contain at least one acrylic and/or methacrylic acid ester having at least 6 carbon atoms in the non-acid moiety, with such acrylic acid esters being preferred. Reactive diluent systems are well-known to those skilled in the art of radiation curing and the selection of an appropriate diluent system in any given instance is sufficiently encompassed by such knowledge as to require no further discussion here.

Compounds (1) which are effective to promote free radical addition polymerization through bimolecular photochemical reactions of the energy donor or transfer type or hydrogen abstraction type of by formation of a donor-acceptor complex with monomers or additives leading to ionic or radical species are well known, as are compounds (2) which are effective to promote free radical addition polymerization by generating reactive specie, such as free radicals, by way on unimolecular scission resulting from photoexcitation. Such compounds (1) and (2) are described as photosensitizers and photoinitiators, respectively, by at least one patentee, see Gruber U.S. Pat. No. 4,017,652 and, for the purpose of establishing some measure of consistency with respect to nomenclature, that description will be followed herein. With respect to photopolymerization processes, photosensitizers are not good initiators per se, but do readily absorb photons to produce an excited molecule which then acts through energy transfer, hydrogen abstraction or formation of a donor-acceptor complex with a second molecule to produce free radicals which are capable of initiating additional polymerization reactions. Unlike the photosensitizers which form free radicals through interaction with a second molecule, photoinitiators absorb photons to produce an excited molecule which can cleave to produce free radicals which are capable of initiating addition polymerization reactions.

Particularly preferred photosensitizers are aromatic ketones and aromatic aldehydes which can exist in a triplet state, especially such ketones and aldehydes which have a triplet energy in the range from 35 to 85, preferably 42 to 72, kilocalories per mole. Such photosensitizers are described in Gruber U.S. Pat. No. 4,017,652 and Osborn et al U.S. Pat. No. 3,759,807, the disclosures of both patents being incorporated herein by reference. Currently, benzophenone, benzil, 4,4'-dichlorobenzophenone, 4-methoxy-benzophenone and dibenzosuberone are preferred.

Photoinitiators are preferably selected from compounds having the formula

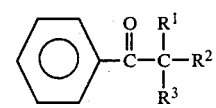 1.

wherein $R^1$, $R^2$ and $R^3$ are independently hydrogen, hydroxyl, halogen, alkyl of 1 to 12, preferably 1 to 8, carbon atoms, alkoxy of 1 to 12, preferably 1 to 8, carbon atoms, or phenyl, providing that $R^1$, $R^2$ and $R^3$ are not concurrently all hydrogen, hydroxyl, halogen, or alkyl; and wherein at least one of $R^1$, $R^2$ or $R^3$ is preferably hydroxyl or alkoxy. The alkyl, alkoxy and phenyl groups can be substituted with moieties which will not interfere with the function of the compound as a photoinitiator. Representative substituent moieties or groups include halogen, alkyl of 1 to 8 carbon atoms, alkoxy having from 1 to 8 carbon atoms in the alkyl group, carboxy and carbalkoxy having from 1 to 8 carbon atoms in the alkyl groups. Photoinitiators in which the alkyl, alkoxy and phenyl groups are unsubstituted are preferred. A second class of preferred photoinitiators has the formula

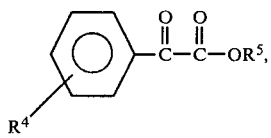

wherein $R^4$ is hydrogen, halogen, alkoxy containing from 1 to 8, preferably 1 to 4, carbon atoms or alkyl containing from 1 to 8, preferably 1 to 4 carbon atoms; and $R^5$ is hydrogen, alkyl containing from 1 to 22 carbon atoms, benzyl, phenyl, hydroxyalkyl containing from 1 to 12 carbon atoms, haloalkyl containing from 1 to 12 carbon atoms, alkoxyalkyl wherein the alkoxy portion contains from 1 to 8 carbon atoms and the alkyl portion contains from 1 to 12 carbon atoms, and phenoxyalkyl wherein the alkyl portion contains from 1 to 12 carbon atoms, $R^5$ being preferably hydrogen, alkyl of 1 to 12 carbon atoms, benzyl or phenyl.

Particularly preferred photoinitiator compounds are represented by the formulae

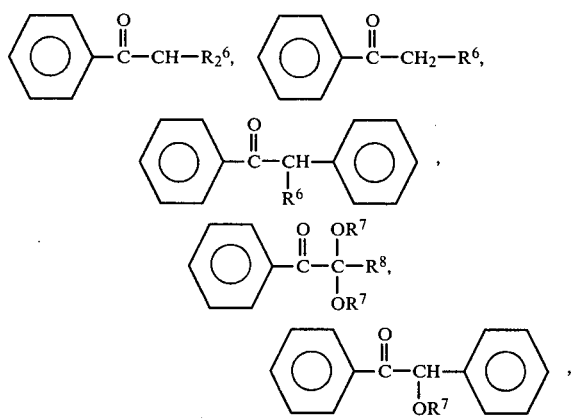

wherein $R^6$ is halogen; $R^7$ is an alkyl group having from 1 to 12, preferably 1 to 8, carbon atoms; and $R^8$ is hydrogen, alkyl of 1 to 12 carbon atoms, aryl of 6 to 14 ring carbon atoms, and cycloalkyl of 5 to 8 ring carbon atoms. Where a plurality of $R^6$ or $R^7$ groups are found on the molecule, they can be the same or different.

The photoinitiators which are employed in combination with the heretofore described photosensitizers in the practice of the invention are well-known articles of commerce. A representative listing of such compounds can be found in U.S. Pat. No. 4,017,652, column 4, lines 46-63; U.S. Pat. No. 4,024,296, column 4, lines 18-37; and U.S. Pat. No. 3,715,293, column 1, line 41 through column 2, line 13.

Presently preferred photocatalyst systems comprise admixtures of, (a), benzophenone and benzoin isobutyl ether and, (b), benzophenone and 2,2-diethoxyacetophenone.

It has also been found that the inclusion of chain transfer agents in the energy-curable compositions employed in the practice of this invention can beneficially affect ultimate cured film properties. Substantially any of the known chain transfer agents can be so employed. Generally, such compounds, when utilized, will be employed at levels not exceeding about 15 parts by weight, per 100 parts of combined weight of unsaturated urethane oligomer and reactive diluent, and preferably will be employed in the range from about 0.1 to about 5 parts by weight. Representative chain transfer agents for addition polymerization reactions include benzene; toluene; ethylbenzene, isopropylbenzene; t-butylbenzene; cyclohexane; heptane; n-butyl chloride; n-butyl bromide; n-butyl iodine; n-butyl alcohol; n-butyl disulfide; acetone; acetic acid; chloroform; carbon tetrachloride; carbon tetrabromide; butylamine; triethylamine; t-butyl mercaptan; n-butyl mercaptan; tertiary aliphatic amines such as triethanolamine and t-butyl diethanolamine; 2-ethylhexane-1,3-dithiol; 1,10-decanedithiol', 1,2-ethanedithiol; 1,3-propanedithiol' 1,6-octanedithiol; 1,8-octanedithiol 1,10-octadecanedithiol; m-benzenedithiol; bis-(2-mercaptoethyl) sulfide; p-xylylenedithiol; pentaerythritol tetra-7-mercaptoheptanoate; mercaptoacetic acid triglyceride; pentanethiol; dodecanothiol; glycol mercaptoacetate; ethyl mercaptoacetate; and esters of thioglycolic and mercaptopropionic acids. Preferred chain transfer agents include both monothiols and polythiols; the polythiols having a molecular weight in the range from about 95 to about 20,000 and having the general formula $$R^9(SH)_m,$$

wherein $R^9$ is a polyvalent organic moiety and m is at least 2, being especially preferred. Particularly preferred polythiols include glycerol trithioglycolate; pentaerythritol tetrathioglycolate; pentaerythritol tetrakis (β-mercaptopropionate); trimethylolpropane tris(thioglycolate); trimethylolpropane tris(β-mercaptopropionate); ethylene glycol bis(thioglycolate); ethylene glycol bis(β-mercaptopropionate) and poly(propylene oxide ether) glycol bis(β-mercaptopropionate).

As noted, unsaturated urethane oligomers having as a polyol precursor a compound which is not a poly(alkylene oxide) poly can be combined with the novel polyesterether polyol-based unsaturated urethane oligomer. In such cases, the coating compositions should contain at least about 25 percent by total weight of combined unsaturated urethane oligomers of at least one poly(alkylene oxide) polyol-based unsaturated urethane oligomer. Representative polyol precursors for such other unsaturated urethane oligomers are polyesters, including caprolactone polyol polyesters.

Preferably, the coating compositions of the invention will also contain from about 0.1 to about 10 parts by weight, per 100 parts combined weight of acrylic urethane oligomer and reactive diluent, of acrylic acid.

The invention compositions can also include pigments, fillers, wetting agents, flatting agents, flow control agents, and other additives typically present in coating compositions. In some applications, the inclusion of minor amounts of inert solvents can be advantageous. Such additive materials are well-known to those skilled in the art and do not require further elaboration herein. Also well-known are the concentrations at which such additives are used.

The coating compositions of this invention are prepared by conventional methods such as blending. The compositions can be applied to wood, metal, fabric and plastic substrates in an economical and efficient manner using conventional industrial techniques and provide smooth, uniform films which are rapidly cured to dried films having excellent physical and chemical properties. The compositions are particularly noteworthy in that they can be cured in the presence of air at rates equivalent to those obtained in inert atmospheres.

The improved coating compositions of this invention can be applied and cured by any of the conventional known methods. Application can be by roll coating, curtain coating, airless spray, dipping or by any other procedure. The cure can be effected by exposure to any high energy source, such as ionizing radiation, or low energy source, and are especially suitable for curing by exposure to actinic radiation, such as ultraviolet light radiation, in the presence of molecular oxygen. The equipment utilized for curing, as well as the appropriate time for curing, and the conditions under which the curing is effected are well-known to those skilled in the art of radiation curing and do not require further elaboration herein.

The invention is illustrated in greater detail by the following Examples, but these examples are not to be construed as limiting the present invention. All parts, percentages and the like are in parts by weight, unless otherwise indicated.

EXAMPLE I

Acrylated urethane resins are prepared employing as precursor compounds 4,4'-methylene-bis(cyclohexyl isocyanate), 2-hydroxyethyl acrylate and (a) poly(1,3-butylene glycol adipate) non-poly(alkylene oxide) polyester polyol, (b) poly(diethylene glycol adipate) polyetherester polyol, and (c) poly(dipropylene glycol adipate) polyetherester polyol. Each polyol has an approximate equivalent weight of 200 and a 2.3 hydroxyl functionality. In each instance, there is added to a reaction vessel equipped with stirrer, condensor, thermometer and gas inlet one equivalent of polyol, 3 equivalents of polyisocyanate and 15 parts by weight of 2-ethylhexyl acrylate. The contents of the reaction vessel are heated to 70° C. under dry air and 0.1 wt. % dibutyl tin dilaurate are added. The reaction is continued until substantially all of the hydroxyl groups are consumed. Two equivalents of 2-hydroxyethyl acrylate are added to the reaction vessel and the reaction is continued until all of the isocyanate groups are consumed. The reaction vessel is cooled to room temperature. In each instance there is obtained a viscous syrup of acrylated urethane oligomer in 2-ethylhexyl acrylate reactive monomer diluent at a resin solids concentration of 85 percent by weight.

Each oligomer is then reduced to 70% total resin solids in 2-ethylhexyl acrylate. To 100 parts of each unsaturated urethane oligomer composition are added four parts of a ⅓ mixture of benzoin butyl ether and benzophenone. The formulations are cast on aluminum panels at 1.5 mil thickness and cured in air using one focused 200 W/linear inch medium pressure mercury vapor lamp at a transport speed of 100 ft./min. The poly(1,3-butylene glycol adipate) polyester polyol-based unsaturated urethane composition requires 8 passes to obtain a tack-free, mar-resistant finish; whereas the poly(diethylene glycol adipate) polyetherester polyol-based and poly(dipropylene glycol adipate) polyetherester polyol-based unsaturated urethane compositions require 4 passes and 5 passes, respectively, to obtain the same level of cure.

EXAMPLE II

The poly(1,3-butylene glycol adipate) polyester polyol-based and poly(dipropylene glycol adipate) polyetherester polyol-based unsaturated urethane compositions of Example I are reduced to 70% total resin solids in 2-ethylhexyl acrylate. To 100 parts of each composition there is added 7 parts by weight of a 1/3/3 mixture of benzoin butyl ether/benzophenone/pentaerythritol tetrakis-(p-mercaptopropionate). The formulations are cast on aluminum panels at 1.5 mil thickness and cured in air following the procedure of Example I. The polyester polyol-based compositions require 8 passes to obtain a tack-free, mar-resistant finish; whereas the polyetherester polyol-based compositions require but 3 passes.

EXAMPLE III

To a reaction vessel similar to that employed in Example I is added 47.15 g. glycerine, 411.06 g poly(tetraethylene oxide) polyol, 166.35 g adipic acid and 21.02 g isophthalic acid. The reaction mixture is heated to 234° C. and the reaction continued to an acid number of 0.36. There is obtained a viscous polyetherester polyol having a hydroxy number of 276 and an acid number of 0.36.

To one equivalent of the thus prepared polyetherester polyol is added 3 equivalents of 4,4'-methylene-bis(cyclohexyl isocyanate) and 15 parts by weight 2-ethylhexyl acrylate. The reaction mixture is heated at 70° C. until substantially all of the hydroxyl groups are consumed, at which time 2 equivalents of 2-hydroxyethyl acrylate are added. The reaction is continued until all of the isocyanate groups are consumed. There is obtained a viscous syrup of poly(tetraethylene oxide) polyetherester-based unsaturated urethane oligomer at a resin solids content of 85 percent by weight.

EXAMPLE IV

The poly(1,3-butylene glycol adipate) polyester polyol-based unsaturated urethane composition (85% resin solids) of Example I and the poly(tetraethylene oxide adipate) polyetherester polyol-based unsaturated urethane composition (85% resin solids) of Example III are diluted to 70% resin solids in 2-ethylhexyl acrylate. To 100 parts of each diluted compositions is added 4 parts by weight of a 3/1 mixture of benzophenone/benzoin butyl ether. Each of the formulations is coated onto vinyl asbestos floor tiles and vinyl sheet goods at 1.5 mil thickness and cured following the procedure of Example II. The polyester polyol-based compositions require at least 8 passes to obtain a tack-free, mar-resistant surface, whereas the polyetherester polyol-based compositions require only 3 passes to obtain a tack-free, mar-resistant surface.

EXAMPLE V

A reaction vessel similar to that employed in Example I is charged with 322 g polycaprolactone diol, 319 g 4,4'-methylene-bis(cyclohexyl isocyanate) and 200 g 2-ethylhexyl acrylate. The reaction mixture is heated at 70° C. until substantially all of the hydroxyl groups are consumed. 176 g 2-hydroxyethyl acrylate are added and the reaction continued at 70° C. until substantially all isochanate functionality is consumed. There is obtained a viscous syrup of polycaprolactone-based unsaturated urethane oligomer in 2-ethylhexyl acrylate at a resin solids content of 85 percent by weight.

The thus-prepared unsaturated urethane composition is diluted to 70% resin solids in 2-ethylhexyl acrylate. To 100 parts of the diluted composition are added 3 parts by weight benzophenone and 1 part by weight benzoin butyl ether. The formulation is cast onto aluminum panels at 1.5 mil wet film thickness and curing is effected following the procedure of Example I. The polycaprolactone polyol-based unsaturated urethane compositions require 16 passes to obtain a tack-free, mar-resistant surface.

EXAMPLE VI

Following the procedure of Example III, 13.88 g glycerine, 418.59 g poly(tetraethylene oxide) polyether polyol, 185.95 g adipic acid and 34.7 g isophthalic acid are reacted to form a polyetherester polyol having a hydroxyl number of 129 and an acid number of 0.77. One equivalent of the thus-prepared polyetherester polyol, three equivalents of 4,4'-methylene-bis(cyclohexyl isocyanate) and two equivalents of 2-hydroxyethyl acrylate are reacted in 2-ethylhexyl acrylate following the procedure of Example I to obtain a polyetherester polyol-based unsaturated urethane oligomer composition at a resin solids content of 85 percent by weight.

The thus-prepared polyetherester polyol-based unsaturated urethane oligomer composition (85% RSC) and the poly(1,3-butylene glycol adipate) polyester polyol-based unsaturated urethane oilgomer composition of Example I (85% RSC) are diluted with N-vinyl pyrrolidone to a solution viscosity of 4000 cps at 25° C. Then to 100 parts of each composition are added 4 parts by weight of a ⅓ mixture of benzoin butyl ether and benzophenone. The resulting formulations are cast onto aluminum panels at 1.5 mil wet film thickness and cured in air by exposure to actinic radiation according to the procedure of Example II. The polyester polyol-based compositions require 8 passes to obtain a tack-free, mar-resistant surface. The polyetherester polyol-based compositions require three passes to obtain the same level of cure.

EXAMPLE VII

The poly(1,3-butylene glycol adipate) polyester polyol-based unsaturated urethane composition (85% RSC) of Example I and the poly(tetraethylene oxide) polyol polyetherester-based unsaturated urethane composition (85% RSC) of Example VI are diluted with N-vinyl pyrrolidone to a solution viscosity of 4000 cps at 25° C. Coating compositions containing benzophenone, benzoin butyl ether and benzophenone/benzoin butyl ether photocatalyst systems are coated onto aluminum panels at 1.5 mil wet film thickness and cured in air by exposure to actinic radiation following the procedure of Example I. The results are reported in the following table:

TABLE I

| Sample | Unsaturated Urethane Type | | Photocatalyst System | | Passes to Cure |
|---|---|---|---|---|---|
| | Polyester | Polyetherester | Benzophenone | Benzoin Butyl Ether | |
| 1 | 100 | — | 1 | — | 15 |
| 2 | — | 100 | 1 | — | 5 |
| 3 | 100 | — | 2 | — | 9 |
| 4 | — | 100 | 2 | — | 4 |
| 5 | 100 | — | 3 | — | 8 |
| 6 | — | 100 | 3 | — | 3 |
| 7 | 100 | — | 2 | 1 | 9 |
| 8 | — | 100 | 2 | 1 | 4 |
| 9 | 100 | — | 1 | 2 | 10 |
| 10 | — | 100 | 1 | 2 | 3 |
| 11 | 100 | — | 1 | 1 | 10 |
| 12 | — | 100 | 1 | 1 | 4 |
| 13 | 100 | — | 1 | 3 | 7 |
| 14 | — | 100 | 1 | 3 | 2 |
| 15 | — | 100 | — | 1 | 12 |
| 16 | — | 100 | — | 3 | 7 |

The formulations containing the polyetherester polyol-based unsaturated urethane resins of the invention cure two to four times faster than equivalent formulations using the non-invention compositions containing polyester polyol-based unsaturated urethane resins. Formulations containing only benzophenone and formulations containing benzophenone/benzoin butyl ether mixtures are effective with the polyetherester polyol-based unsaturated urethane resin compositions for cure in air by exposure to actinic radiation.

EXAMPLE VIII

Compositions 4 and 12 of Example VI are cast onto aluminum panels at 1.5 and 8 mil wet film thickness and cured in air using one 200 W/linear inch medium pressure mercury vapor lamp at a transport speed of 200 ft./min. All coatings obtained a tack-free, mar-resistant surface finish in four passes. The thin film (1.5 mil) coatings are completely cured. The underlying regions of the 8 mil film of composition 4 which contains only 2 parts benzophenone is incompletely cured. Complete cure, surface and bulk, of the 8 mil film of composition 12, which contains a 1/1 admixture of benzophenone and benzoin butyl ether, is obtained.

EXAMPLE IX

To 100 parts of each N-vinyl pyrrolidone-diluted (4000 cps at 25° C.) composition of Example VII are added 4 parts by weight of a 1:3 mixture of benzoin butyl ether and benzophenone. Blends of the compositions are prepared, cast onto aluminum panels at 1.5 mil wet film thickness and cured by exposure to actinic radiation in air following the procedure of Example VIII. The results are reported in Table II.

TABLE II

| Sample | Unsaturated Urethane | | Passes To Cure |
|---|---|---|---|
| | Polyester | Polyetherester | |
| 1 | 0 | 100 | 3 |
| 2 | 25 | 75 | 3–4 |
| 3 | 50 | 50 | 3–4 |
| 4 | 75 | 25 | 4–5 |
| 5 | 100 | 0 | 8 |

The data indicates that unsaturated urethane compositions containing at least about 25 weight percent (based on total unsaturated urethane component) of at least one polyetherester polyol-based unsaturated urethane resin prepared according to the invention can be effectively cured in air without significant compromising of cure rate.

EXAMPLE X

Following the procedure of Example VI, a polyetherester polyol is prepared employing as precursor materials 244 g adipic acid, 45 g isophthalic acid, 250 g poly(tetraethylene oxide) polyol, 110 g 1,3-butylene glycol and 20 g glycerine. An unsaturated urethane resin composition is prepared according to the procedure of Example I from 339 g of the thus-prepared polyetherester polyol, 339 g 4,4'-methylene-bis(cyclohexyl isocyanate) and 232 g 2-hydroxyethyl acrylate in 421.7 g 2-ethylhexyl acrylate. To 100 parts by weight of the unsaturated urethane composition there is added 4 parts by weight of a 1:3 mixture of benzoin butyl ether and benzophenone. The formulations are cast onto aluminum panels at 1.5 mil wet film thickness and cure is effected following the procedure of Example IX. Only 4 passes are required to obtain a tack-free, mar-resistant surface (cf. the polyester polyol-based compositions of Example IV require at least 8 passes at a slower transport speed to obtain the same level of cure).

EXAMPLE XI

Following the procedure of Example VI, a polyetherester polyol is prepared employing as precursor materials 200.0 g (1 eq.) of 1,3-butylene glycol/glycerine/adipic acid/isophthalic acid polyester polyol having a hydroxy functionality of 2.3, 53.0 g diethylene glycol and 146.0 g adipic acid. An unsaturated oligomer composition (70% RSC in 2-ethylhexyl acrylate) is prepared according to the procedure of Example I from 273.0 g of the thus-prepared polyetherester polyol, 269.0 g 4,4'-methylene-bis(cyclohexyl isocyanate), and 159.0 g 2-hydroxyethyl acrylate in 300.0 g 2-ethylhexyl acrylate. To 100 parts of the resulting polyetherester polyol-based unsaturated urethane composition is added 4 parts by weight of a 3:1 mixture of benzophenone and benzoin butyl ether. The formulation is coated onto aluminum panels at 1.5 mil wet film thickness and cured in air by exposure to actinic radiation in accordance with the procedure. Three passes are required to obtain a tack-free, mar-resistant surface finish.

EXAMPLE XII

Acrylated polyesters and polyetheresters are prepared as follows:

Acrylated Polyester AP-I: A reaction vessel is charged under a nitrogen atmosphere with 105 g trimethyol propane, 49 g neopentyl glycol, 190 g adipic acid, 106 g isophthalic acid and 207 g 1,4-cyclohexane dimethanol. The reaction mixture is heated to 242° C. for three hours and 67 ml of water are removed. 600 g or the resulting hydroxyl-terminated polyester, 173 g acrylic acid, 193 g mineral spirits, 0.08 g methoxyhydroquinone and 4 g methane sulfonic acid are heated at 100° C. under a dry air sweep for ten hours. 44 ml water are removed in an azeotrope with the mineral spirits. The contents of the reaction vessel are stripped of solvent and cooled. There is obtained a clear viscous syrup of acrylated polyester oligomer.

Acrylated Polyetherester APEE-I: Following the procedure employed in forming AP-I, 177 g poly(tetraethylene oxide) polyol, 127 g 1,4-cyclohexane dimethanol, 89 g trimethylolpropane, 172 g adipic acid, and 98 g isophthalic acid are reacted for 9 hours, during which time 63 ml of water are removed. 600 g of the resulting hydroxyl-functional polyetherester, 149 g acrylic acid, 100 ppm methoxyhydroquinone, 100 ppm phenothiazine, 3.6 g methane sulfonic acid and sufficient hexane to maintain a reflux at 100° C. is reacted for 14 hours, during which time 25 ml of water are removed. The hexane is vacuum stripped from the reaction product. There is obtained a clear viscous syrup of acrylated polyetherester.

Acrylated Polyether APE-I: 196 g poly(tetraethylene oxide) polyol, 150 g acrylic acid, 100 ppm methoxyhydroquinone, 100 ppm phenothiazine, 3.6 g methane sulfonic acid and sufficient hexane to maintain a reflux at 100° C. is reacted for 14 hours, during which time 36 ml water are removed. The hexane is vacuum stripped from the reaction product. There is obtained a clear viscous syrup of acrylated polyether.

To 100 parts of each of AP-I, APEE-I and APE-I acrylated oligomer compositions are added 3 parts benzophenone and 1 part benzoine butyl ethers. The formulations are coated onto aluminum panels, vinyl asbestos tile and vinyl sheet goods at a 1.5 ml wet film thickness and cured in air using one 200 W/linear inch medium pressure mercury vapor lamp at a transport speed of 100 ft./min. The number of passes to obtain a tack-free, mar-resistant surface finish for AP-I oligomer compositions is three, for APEE-I oligomer compositions is one, and for APE-I oligomer compositions is one.

The data demonstrate that unsaturated urethane oligomer compositions derived from poly(alkylene oxide) polyols cure in air at a rate significantly greater than do such oligomer compositions derived from polyester polyols which do not contain residues of poly(alkylene oxide) polyols in the main chain. The data also demonstrate that acrylated polyether and polyetherester compositions derived from poly(alkylene oxide) polyols cure in air at a rate significantly greater than do such oligomer compositions derived from polyester polyols which do not contain residues of poly(alkylene oxide) polyols in the main chain.

What is claimed is:

1. Unsaturated addition-polymerizable urethane resins characterized by the presence of at least one ethylenically unsaturated group having the structure —CH=C>, said resins being further characterized by the presence in the backbone chain of said resins of the residue of at least one poly(alkylene oxide) polyol, said backbone chain being separated from said unsaturated group by at least two urethane groups, said resins consisting essentially of the reaction product of
   (i) at least one organic isocyanate compound having at least two isocyanate groups;
   (ii) at least one polyetherester polyol having at least two hydroxy groups and having the residue of at least one poly(alkylene oxide) polyol integrated into the backbone chain of such polyetherester polyol; and
   (iii) at least one unsaturated addition-polymerizable monomeric compound having a single isocyanate-reactive active hydrogen group;
   there being present an excess of isocyanate compound with respect to the hydroxy groups of said polyetherester polyol;
   said unsaturated addition-polymerizable monomeric compound having a single isocyanate-reactive hydrogen group being present in an amount sufficient to provide at least one molar equivalent of active hydrogen group with respect to isocyanate reactivity.

2. Unsaturated urethane resins according to claim 1 wherein said polyetherester polyol comprises the reaction product of
   (a) from 3 to 100 mol percent of at least one poly(alkylene oxide) polyol having at least two hydroxyl groups;

(b) from 97 to zero mol percent of at least one polymeric non-poly(alkylene oxide) polyol having at least two hydroxyl groups;

(c) from 97 to zero mol percent of at least one monomeric polyol having at least two hydroxyl groups; and (d) from 97 to zero mol percent of at least one polyester which does not contain poly(alkylene oxide) polyol residues in its main chain;

said mol percents being based on total mols of 2-a, 2-b, 2-c and 2-d; and (e) at least one organic polycarboxylic acid characterized by the presence of at least two carboxyl groups.

3. A coating composition comprising (a) at least one unsaturated resin comprising the reaction product of (i) at least one organic isocyanate compound having at least two isocyanate groups;

(ii) at least one polyetherester polyol having at least two hydroxy groups and having the residue of at least one poly(alkylene oxide) polyol integrated into the backbone chain of such polyetherester; and (iii) at least one unsaturated addition-polymerizable monomeric compound having a single isocyanate-functional active hydrogen group;

there being present an excess of isocyanate compound with respect to the hydroxyl groups of said poly(alkylene oxide) polyol;

said unsaturated addition-polymerizable monomeric compound having a single isocyanate-reactive active hydrogen group being present in an amount sufficient to provide at least one molar equivalent of active hydrogen group with respect to isocyanate reactivity; and (b) a reactive diluent system comprising at least one unsaturated addition-polymerizable monomeric compound which is copolymerizable with said unsaturated urethane resin;

the amount of unsaturated urethane resin being in the range from about 30 to about 90 weight percent, based on total weight of unsaturated urethane resin and reactive diluent system.

4. A coating composition according to claim 3 wherein said diluent system contains at least one unsaturated addition-polymerizable monofunctional monomeric compound selected from the group consisting of esters having the general formula

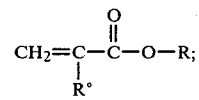

wherein R° is hydrogen or methyl and R is an aliphatic or cycloaliphatic group having from 4 to 18 carbon atoms.

5. A coating composition according to claim 3 wherein said polyetherester polyol comprises the reaction product of (a) from 3 to 100 mol percent of at least one poly(alkylene oxide) polyol having at least two hydroxyl groups;

(b) from 97 to zero mol percent of at least one polymeric non-poly(alkylene oxide) polyol having at least two hydroxyl groups;

(c) from 97 to zero mol percent of at least one monomeric polyol having at least two hydroxyl groups; and (d) from 97 to zero mol percent of at least one polyester which does not contain poly(alkylene oxide) polyol residues in its main chain;

said mol percents being based on total mols of 5-a, 5-b, 5-c and 5-d; and (e) at least one organic polycarboxylic acid having at least two carboxyl groups, including anhydrides of such acids.

6. A coating composition according to claim 5 wherein said diluent system contains at least one unsaturated addition-polymerizable monomeric compound selected from the group consisting of esters having the general formula

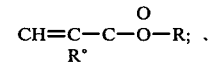

wherein R° is hydrogen or methyl and R is an aliphatic or cycloaliphatic group having from 4 to 18 carbon atoms.

* * * * *